United States Patent
Takahashi et al.

[11] Patent Number: 6,108,543
[45] Date of Patent: *Aug. 22, 2000

[54] RADIO COMMUNICATION APPARATUS CONNECTED WITH A BASE STATION USED IN A SERVICE AREA PRIOR TO THE OTHERS

[75] Inventors: Shinya Takahashi; Munehisa Tomioka, both of Tokyo, Japan

[73] Assignee: Kabushiki Kaisha Toshiba, Kawasaki, Japan

[*] Notice: This patent is subject to a terminal disclaimer.

[21] Appl. No.: 09/190,018

[22] Filed: Nov. 12, 1998

Related U.S. Application Data

[62] Division of application No. 08/405,204, Mar. 16, 1995, Pat. No. 5,854,980.

[30] Foreign Application Priority Data

Mar. 18, 1994 [JP] Japan ................................. 6-048867

[51] Int. Cl.7 .................................................. H04Q 7/32
[52] U.S. Cl. ........................................ 455/434; 455/515
[58] Field of Search ................................ 455/434, 515, 455/450, 509, 510, 511, 512, 513, 514, 516; 370/324, 350

[56] References Cited

U.S. PATENT DOCUMENTS

| | | | |
|---|---|---|---|
| 4,742,560 | 5/1988 | Arai | 455/33.1 |
| 4,905,301 | 2/1990 | Krolopp et al. | 455/166.1 |
| 4,916,728 | 4/1990 | Blair | 379/59 |
| 5,101,500 | 3/1992 | Marui et al. | 455/33.1 |
| 5,437,053 | 7/1995 | Sawa et al. | 455/422 |
| 5,442,806 | 8/1995 | Barber et al. | 455/33.1 |
| 5,444,765 | 8/1995 | Marui et al. | 379/59 |
| 5,517,673 | 5/1996 | Fehnel | 455/422 |
| 5,854,980 | 12/1998 | Takahashi et al. | 455/434 |

*Primary Examiner*—Lee Nguyen
*Attorney, Agent, or Firm*—Banner & Witcoff, Ltd.

[57] ABSTRACT

A radio communication apparatus communicates with a base station in a home service area over a paging channel during a standby state for awaiting a call origination or a call reception. Responsive to the call origination or the call reception, the apparatus selects an access channel coincident with the paging channel and communicates with the base station over the access channel for the call origination or the call reception.

30 Claims, 13 Drawing Sheets

RADIO COMMUNICATION APPARATUS CONNECTED WITH A BASE STATION USED IN A SERVICE AREA PRIOR TO THE OTHERS

This application is a division of Ser. No. 08/405,204 filed Mar. 16, 1995 now U.S. Pat. No. 5,854,980.

FIELD OF THE INVENTION

The present invention relates to the field of radio communication apparatuses used in radio communication systems. These systems include automobile radio telephone systems, portable radio telephone systems, personal communication systems, and the like.

More specifically, the present invention relates to a radio communication apparatus used in a radio communication system in which radio channels used during a standby state for awaiting a call origination or a call reception are also utilized as radio channels for the call origination or the call reception between a mobile station and a base station.

DESCRIPTION OF THE RELATED ART

A radio communication system will be described with reference to FIG. 15. The system comprises control station CS connected with wire telephone network NW, a plurality of base stations BS1-BSn, which are respectively connected with the control station CS via landlines CL1-CLn, and a plurality of mobile radio stations MS1-MSn. Each of these base stations BS1-BSn has its own radio zone E1-En, respectively. The mobile radio stations MS1-MSn may be in communication with the base stations BS1-BSn via radio links in the radio zones E1-En. If an apparatus user travels out of a zone E1 and enters another zone E2, a radio link is established between the apparatus and a base station BS2 instead of between the apparatus and a base station BS1.

A plurality of zones (E1-En) provides a service area. Generally, a radio communication system comprises a plurality of service areas. However, an identification number assigned to a service area to distinguish from the others is called a system identification number. Different system identification numbers are assigned to each of service areas, respectively. Each of the service areas is controlled by its respective control station. If it is a service area assigned a system identification number coincident with a system identification number stored in the apparatus, the service area is called a home area for the apparatus. Otherwise, the service area is called a roam area for the apparatus.

User fees for calls from the mobile radio apparatus in a roam area are higher than the fees in a home area. When a user is located in a roam area and originates a call, a high fee is usually charged for the communication. Further, when the user is called and receives an incoming signal while located in a roam area, a high fee is charged for the communication.

The user may bring the radio apparatus into an area accessible to a base station in a home area and the other one or more base stations in roam areas, the accessible area such as a border area covered by signals from both the base station in the home area and the other base stations in the roam area. In this case, even if the mobile radio apparatus is on a standby state in connection with the base station in the home area, it may be possible that the mobile radio apparatus becomes connected with a base station in a roam area when the user originates or receives a call. Accordingly, the user is annoyed with being unwillingly charged higher fees.

SUMMARY OF THE INVENTION

It is accordingly an object of the present invention to provide a radio communication apparatus which is preferentially connected with a base station in a home service area.

It is another object of the present invention to provide a radio communication apparatus which enables the user to reduce user fees for calls as much as possible.

To achieve one or more of the objects, as embodied and described herein, the radio communication apparatus according to the present invention comprises a memory for storing a system identification number corresponding to a service area; a receiver for receiving signals transmitted over radio channels; a first selector for selecting a channel of a first group over which signals including a first system identification number coincident with the system identification number stored in the memory are received by the receiver; and a second selector for selecting a channel of a second group coincident with the channel of the first group selected by the first selector, the channel of the second group over which signals are received by the receiver, and wherein the channel selected by the second selector is used for call origination or call reception.

DESCRIPTION OF THE PREFERRED EMBODIMENTS

A radio communication apparatus in accordance with the present invention will be described with reference to the attached drawings.

Figure 1:
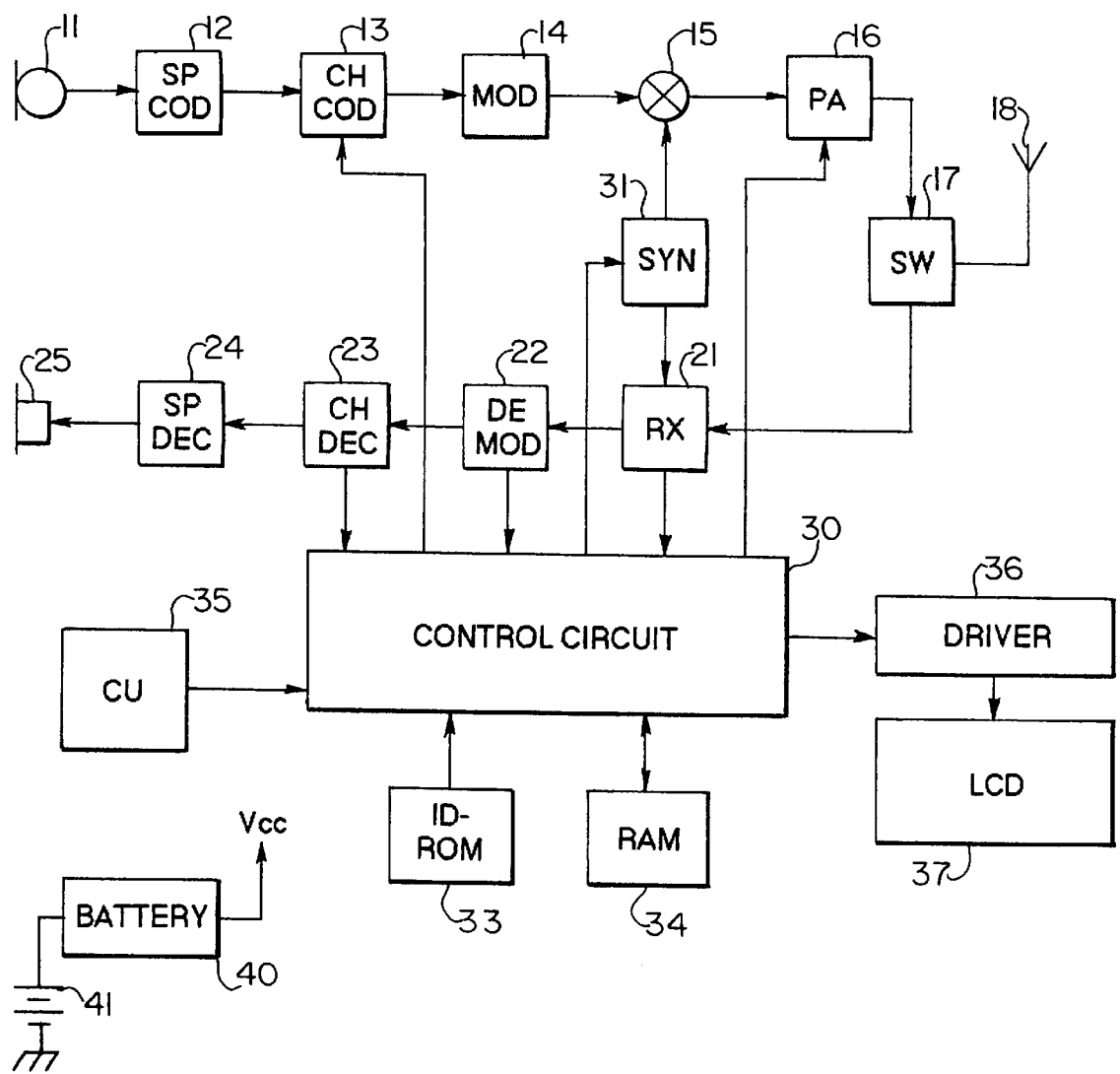
FIG. 1 is a block diagram illustrating an arrangement of a radio telephone apparatus according to an embodiment of the present invention.

Referring first to FIG. 1, there is shown a block diagram of a radio telephone apparatus in accordance with an embodiment of the present invention.

The radio telephone apparatus is roughly divided into transmission, reception and control sections. Reference numeral 40 denotes a power supply, such as a battery. The transmission section comprises microphone 11, speech coder (SPCOD) 12, error correction coder (CHCOD) 13, digital modulator (MOD) 14, mixer 15, power amplifier (PA) 16, high frequency switch circuit (SW) 17 and antenna 18.

A transmitted audio signal from the microphone 11 is subjected to a coding operation at the speech coder 12. The speech coder 12 outputs a digital transmit signal. The error correction coder 13 performs its error correction coding operation over the digital transmit signal and a digital control signal issued from control circuit 30 (which will be explained later).

The digital modulator 14 generates a modulation signal corresponding to the digital transmit signal issued from the error correction coder 13. The mixer 15 mixes the modulation signal received from the digital modulator 14 and a carrier signal received from synthesizer 31 for frequency conversion Power amplifier 16 amplifies the high frequency signal received from the mixer 15 into a predetermined level.

The high frequency switch 17 is turned on only for a period of time corresponding to a transmit time slot specified by the control circuit 30. During this time, the high frequency switch 17 receives the transmit signal from the power amplifier 16 and supplies it to the antenna 18. The transmit signal is transmitted toward a base station (not shown) in the form of a radio transmit signal.

The receiver section includes receiver (RX) 21, digital demodulator (DEMOD) 22, error correction decoder (CHDEC) 23, speech decoder (SPDEC) 24, and speaker 25.

The receiver 21 performs its frequency converting operation over a radio receive signal received from the antenna 18 through the high frequency switch 17. Further, the receiver 21 supplies electric field intensity information of the radio receive signal to the control circuit 30. The digital demodulator 22 performs its bit and frame synchronizing operations over a receive signal received from the receiver 21 to obtain a synchronized signal and supplies the synchronized signal to the control circuit 30. The bit and frame synchronizing operations are defined as word synchronization. The error correction decoder 23 performs its error correction decoding operation over a digital demodulation signal received from the digital demodulator 22 to obtain a digital receive signal.

The digital receive signal issued from the error correction decoder 23 is sent to the speech decoder 24. The speech decoder 24 performs its decoding operation over the digital receive signal so that the digital receive signal is converted into an analog receive signal. The analog receive signal is then sent to the speaker 25.

Further, the control section includes aforementioned control circuit 30, aforementioned frequency synthesizer (SYN) 31, ID-ROM 33 for storing system identification numbers, RAM 34 for storing control data, console unit (CU) 35, LCD driver 36, and LCD 37. Synthesizer 31 generates an oscillation frequency necessary for radio communication with the base station under control of the control circuit 30.

The control circuit 30 comprises a microcomputer. The control circuit 30 includes first area display control means, second area display control means, channel determining means, and access channel select means in addition to ordinary functions related to the communication process. In a predetermined band of frequencies, radio channels are assigned to dedicated channels for use in initializing operation of the apparatus. Each channel corresponds to a certain frequency. In addition, during a standby state for awaiting a call origination or a call reception, the dedicated channels are also used as radio channels (called paging channels) over which the apparatus receives control data from a base station. Further, the radio channels used as dedicated channels and paging channels are utilized for channels called access channels over which call origination or call reception indicators are sent between the apparatus and a base station.

The ID-ROM 33 is an $E^2PROM$ having a registration area. A system identification number is assigned to each of a plurality of systems. The system identification number registered in the ID-ROM 33 is defined as SIDH in this specification.

Telephone numbers from the console unit 34 and the SID from the base station are stored in the RAM 34. The console unit 35 has a keypad including a dialing key and a call origination key. The LCD 37 is driven by the driver 36 and displays information for operating the telephone.

The control circuit 30 detects the system identification number transmitted from the base station. The SID is compared with the SIDH stored in the ID-ROM 33. When the SID coincides with (i.e., is the same as) the SIDH, the control circuit 30 outputs information that the apparatus is located in a home area. When the SID does not coincide with the SIDH, the control circuit 30 outputs information that the apparatus is located in a roam area. This information is displayed on the LCD 37.

More specifically, the first area display control means detects and stores in the RAM 34 the SID received from the base station over paging channels used during a standby state. The SID received over paging channels is defined as SIDp. The detected SIDp is compared with the SIDH stored in the ID-ROM 33. When the SIDp does not coincide with the SIDH, the first area display control means controls the display driver 36 to display "ROAM" on the LCD 37. This display indicates that the radio telephone apparatus is located in a roam area, not in a home area. On the other hand, when the SIDp coincides with the SIDH, the first area display control means controls the display driver 36 not to display "ROAM". This indicates that the radio telephone apparatus is located in a home area.

The second area display control means detects the SID received from the base station over access channels used during a call origination process and a call reception process. The SID received over access channels is defined as SIDA. The detected SIDA is compared with the SIDH stored in the ID-ROM 33. When the SIDA does not coincide with the SIDH, the first area display control means controls the display driver 36 to display "ROAM" on the LCD 37. This display indicates that the radio telephone apparatus is located in a roam area, not in a home area. On the other hand, when the SIDA coincides with the SIDH, the first area display control means controls the display driver 36 not to display "ROAM". This indicates that the radio telephone apparatus is located in a home area.

During a call origination process and a call reception process, the channel determining means compares each of the access channels, (frequencies or numbers) over which signals have at least a predetermined electric field intensity, with a home paging channel used during a standby state. As a result of the comparison, it is determined whether the access channels include a channel coincident with the stored paging channel.

During a call origination process and a call reception process the access channel select means scans each of the access channels and determines their respective electric field intensity. The access channels over which signals may have at least a predetermined electric field intensity are listed on a best list in a descending order.

Notwithstanding the above process, when the channel determining means determines that there is an access channel coincident with the stored paging channel, the access channel is given a priority and may be listed on the top of the best list.

A connection control operation of the telephone apparatus will now be described with reference to FIG. 2 When a power switch is turned on, a reset operation starts (step 2a). This operation is described with reference to FIG. 3.

In response to the power switch, the control circuit 30 resets each section (step 3a). After that, whether the apparatus is allowed to be used or not is checked. This check is defined as a lock state check (step 3b). As long as the lock state is not cancelled, another party is not allowed to operate the apparatus. In this state, "LOCK" is displayed on the LCD 37 (step 3c). In the event that the apparatus is not set to be in the "Lock state", "NO SVC" is displayed (step 3d). "NO SVC" means that a link with a communication service is not available during the reset operation. After the reset operation, initialization starts (step 2b).

Figure 4:
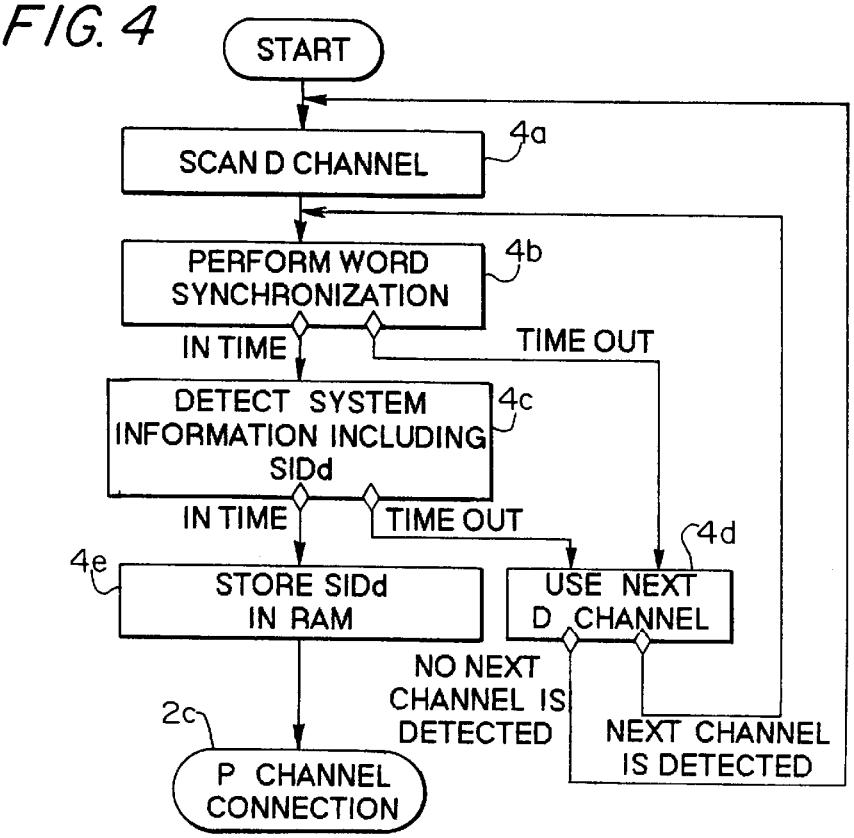
FIG. 4 is a flow chart illustrating a initialization operation step in the connection control of FIG. 2.

FIG. 4 is a detailed flow chart which illustrates the initial radio channel connection operation, defined as the initialization. The control circuit 30 controls the synthesizer 31 to change the frequency of output therefrom. Thereby, a predetermined range of control channels (dedicated channels, hereinafter referred to as D channels) are scanned in the receiver 21 to obtain the information indicative of electric field intensity of the received signals over each channel (step 4a). The channel having the strongest electric field intensity is selected from the D channels and the apparatus is ready for receiving signals through the D channel having the strongest electric field intensity. In this case, information of a channel having the second strongest intensity is also obtained.

The control circuit 30 performs bit and frame synchronization operations (hereinafter referred to as word synchronization) on signals received through the selected D channel (step 4b). If the word synchronization is performed within a predetermined period of time, system information is detected by signals received through this D channel (step 4c).

The system information includes a system identification number (SIDd). If the system information is detected within a predetermined period of time, the control circuit 30 detects the received SIDd and controls the RAM 34 to store the SIDd (step 4e).

If the word synchronization or the system information reception is not performed within a predetermined period of time in the step 4b or the step 4c, the D channel having the second strongest intensity is used to repeat the above operation (step 4d). In this case, if the word synchronization or the system information reception is again not performed within the predetermined period of time, the control circuit 30 scans the D channels again (step 4a).

When the above initialization operations are completed, the control circuit 30 continues the communication sequence and performs scanning similar to the above scanning operation, for the paging channels (hereinafter referred to as P channels) for receiving an incoming signal (step 2c).

Figure 5:
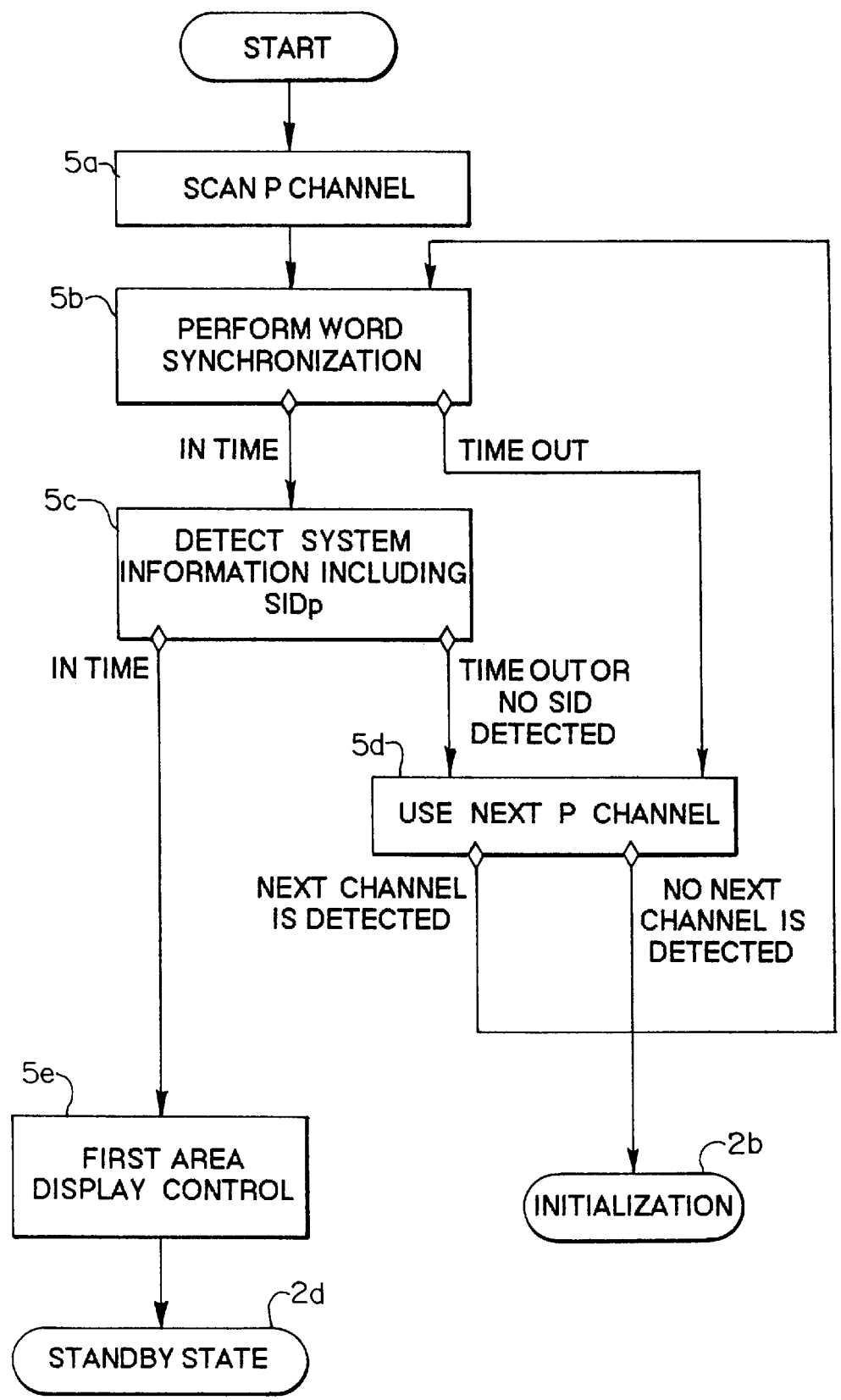
FIG. 5 is a flow chart illustrating an operation after initialization in the connection control operation.

FIG. 5 is a detailed flow chart which illustrates the P channel connection after initialization. The control circuit 30 causes the receiver 21 to scan the P channels to obtain information indicative of the electric field intensity of the received signals. The apparatus is ready for receiving information through the P channel having the strongest electric field intensity. In this case, information indicative of the P channel having the second strongest intensity is also obtained. Both of the obtained P channels are listed in a list called "best list" (step 5a).

The word synchronization operation is performed on signals received through the P channel having the strongest electric field intensity (step 5b). After that, the control circuit 30 obtains system information including a system identification number (SIDp) and compares this SIDp received through the P channel with the SIDd received through the D channel which is temporarily stored in the RAM 34. If the SIDp received through the P channel coincides with the SIDd received through the D channel, the control circuit 30 controls to store the SIDp in the RAM 34 (step 5c). Otherwise, the initialization is resumed (step 2b).

If the word synchronization is not performed or the system information SIDp is not detected within a predetermined period of time in the step 5b or the step 5c, the P channel having the second strongest intensity is used to repeat the operation described above (step 5d). When the word synchronization or the system information detection is again not performed within the predetermined period of time, the initialization is resumed (step 2b).

In the event that the SIDp received through the P channel coincides with the SIDd received through the D channel in the step 5c within the predetermined time, the control circuit 30 performs the first area display control (step 5e).

Figure 6:
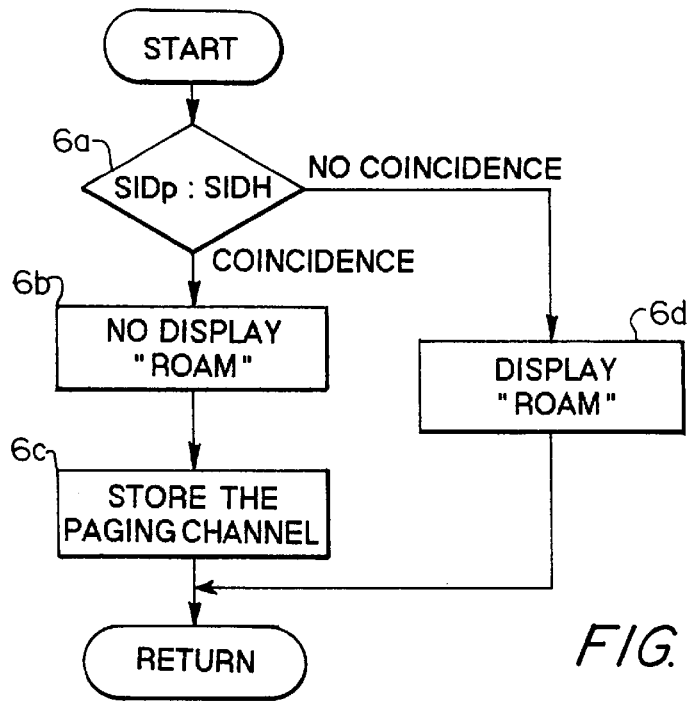
FIG. 6 is a flow chart illustrating a first display operation.

FIG. 6 is a detailed flow chart which illustrates the first area display control operation.

The control circuit 30 compares the SIDp stored in the RAM 34 with the SIDH stored in the ID-ROM 33 (step 6a). As a result of the comparison, if the SIDp coincides with the SIDH, the control circuit 30 controls the driver 36 not to display "ROAM" on the display 37. This indicates that the apparatus is located in a home area (step 6b). Further, the paging channel information is stored in the RAM 34 (step 6c). On the other hand, if the SIDp does not coincide with the SIDH, the control circuit 30 controls the driver 36 to display "ROAM" on a display 37. This indicates that the apparatus is located in the roam area (step 6d).

According to the above operation, when the word synchronization is established on signals received over a paging channel with a strongest electric field intensity, a SIDp included in signals received over the paging channel is compared with the SIDH stored in the ID-ROM 33. If there is coincidence between the SIDp and the SIDH, the paging channel with the strongest electric field intensity is stored in the RAM 34. The paging channel is also used for connection with a base station during a standby state. If there is no coincidence between the SIDp and the SIDH, the paging channel with the strongest electric field intensity is used, without being stored in the RAM 34, for connection with a base station during a standby state.

Consequently, the user can recognize by the display whether he or she is in a home area or in a roam area.

Referring to FIG. 5 again, the operation goes to a standby state (step 2d).

Another embodiment of the paging channel selecting operation may be applicable to the present invention. When a paging channel with a strongest electric field intensity is established synchronization, a SIDp included in signals received over the paging channel is compared with the SIDH stored in the ID-ROM 33. If there is coincidence between the SIDp and the SIDH, the paging channel with the strongest electric field intensity is used for connection with a base station during a standby state. In addition, the paging channel is stored in the RAM 34. If there is no coincidence between the SIDp and the SIDH, synchronization establishment is attempted on signals received over a paging channel with a second strongest electric field intensity. When the synchronization is established, a SIDp included in signals received over the paging channel is compared with the SIDH stored in the ID-ROM 33. If there is no coincidence between the SIDp and the SIDH, the paging channel with the strongest electric field intensity is used for connection with a base station during a standby state. If there is coincidence between the SIDp and the SIDH, the paging channel with the second strongest electric field intensity is used for connection with a base station during a standby state. In addition, the paging channel is stored in the RAM 34.

Figure 2:
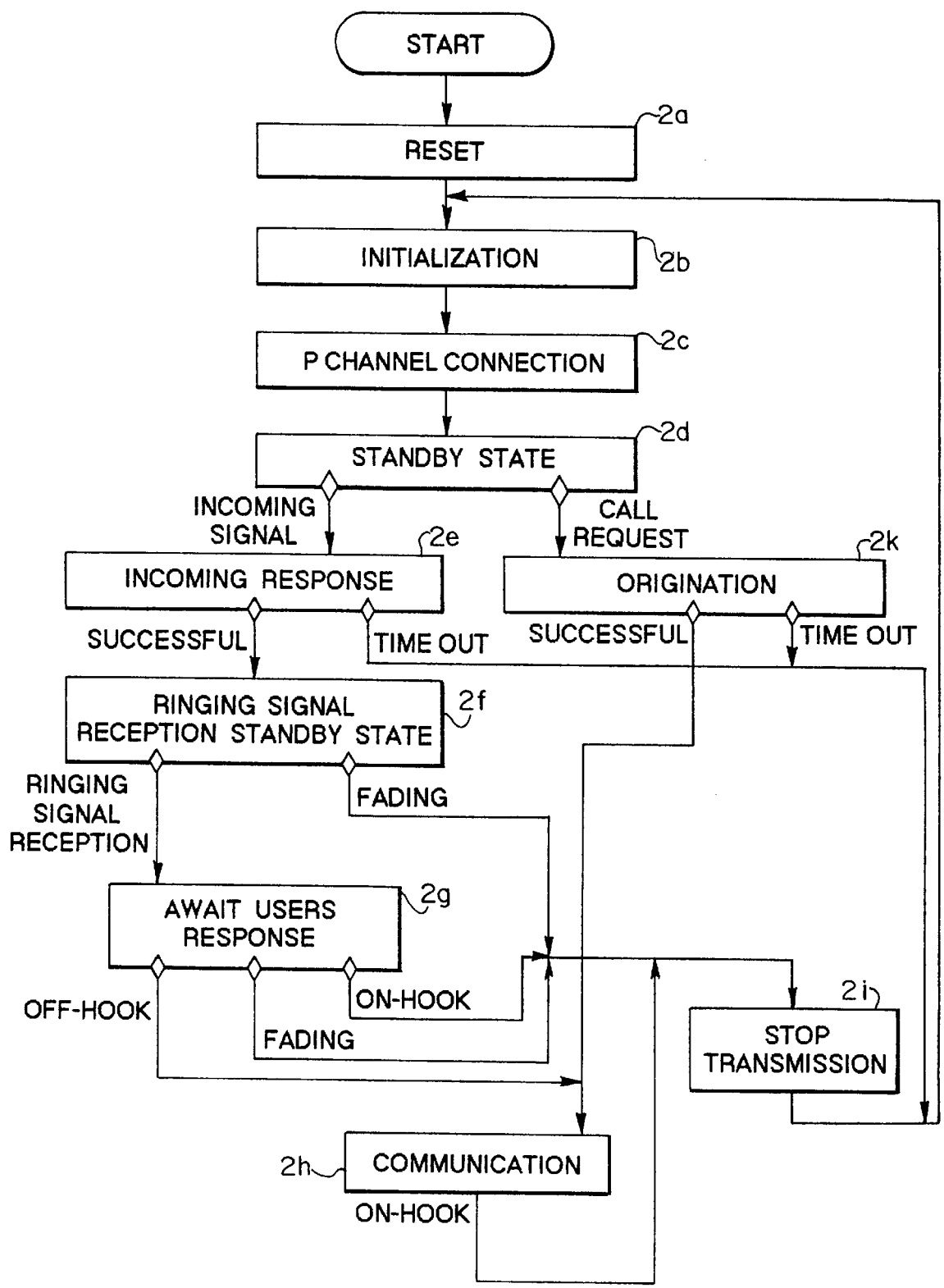
FIG. 2 is a flow chart illustrating a connection control operation sequence in the radio telephone system of the present invention.
Figure 3:
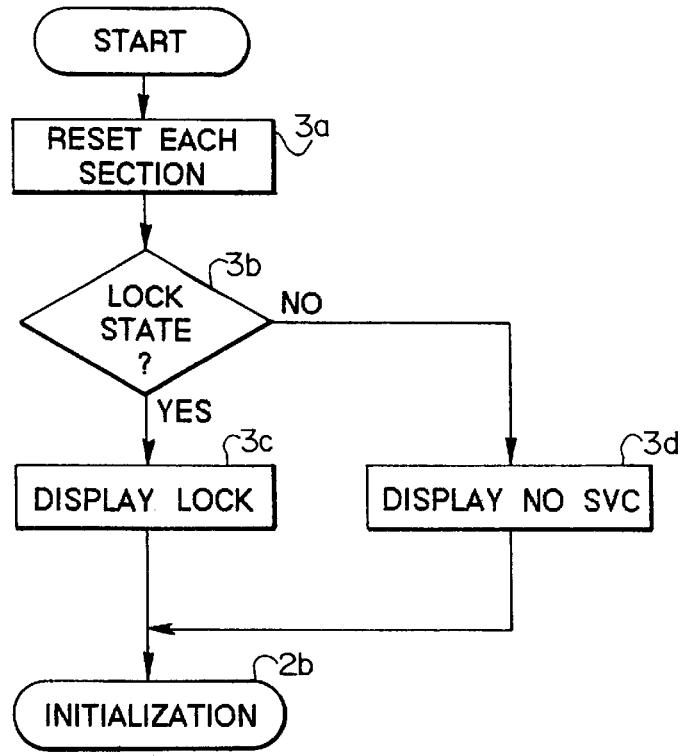
FIG. 3 is a flow chart illustrating a reset operation step in the connection control operation of FIG. 2.
Figure 7:
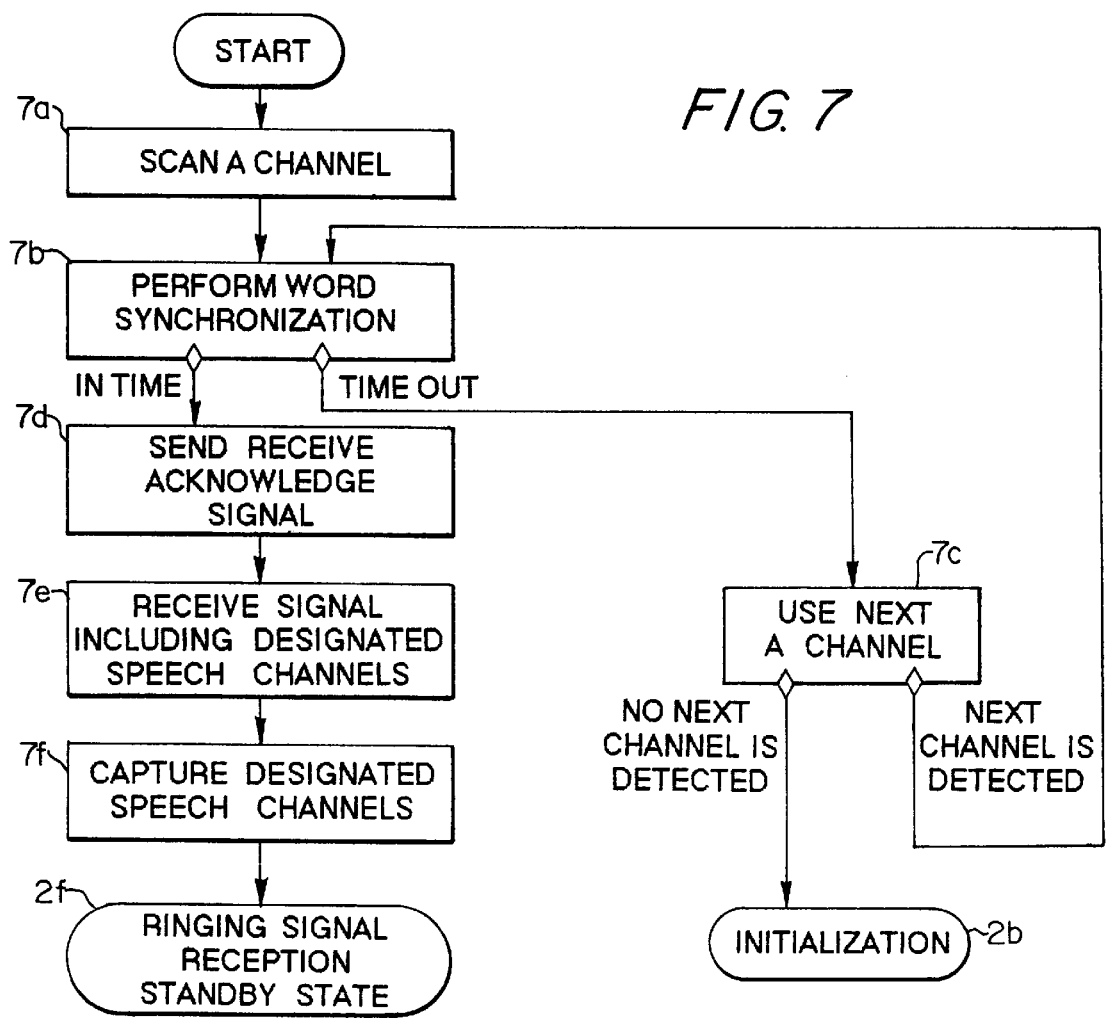
FIG. 7 is a flow chart illustrating an incoming response operation sequence in the connection control operation.

In the standby state in the step 2d of FIG. 2, if the apparatus receives an incoming signal, an incoming response sequence is performed (step 2e). The sequence is illustrated by FIG. 7.

The control circuit 30 causes the receiver 21 to scan each predetermined control channel (hereinafter referred to as A channels) to obtain reception electric field intensity information. The apparatus is ready for receiving information through the A channel having the strongest electric field intensity. In this case, information indicative of the control channel having the second strongest electric field intensity is also obtained.

The obtained information such as channel numbers are stored in a best list of the RAM 34 for selecting A channels. The A channel with the strongest electric field intensity is stored as the best channel to select when requested. The A channel with the second strongest intensity is stored as the second best channel to select (step 7a).

Next, a word synchronization is performed on signals received through the best A channel. When the P channel is stored in the RAM 34, if the word synchronization is performed within a predetermined period of time, the best A channel is compared with the P channel stored in the RAM 34. If there is coincidence between the stored P channel and the best A channel, the best A channel is used for connection with a base station. If there is no coincidence between the stored P channel and the best A channel, the stored P channel is selected and the word synchronization is attempted on signals received over an A channel equal to the stored P channel. If the word synchronization is established, the A channel is used for connection with a base station (step 7b). When it fails to establish the word synchronization on signals received over both the best A channel and the A channel equal to the stored P channel, the best A channel in the best list is selected again and used for connection with a base station (step 7c).

When the P channel is not stored in the RAM 34, the conventional way of A channel selecting operation is performed in the steps 7b and 7c, according to the electric field intensity.

As another embodiment of the access channel selecting operation, it may be possible to first perform the word synchronization on signals received over an A channel equal to the P channel stored in the RAM 34 prior to the best A channel. Signals received over the best channel have the strongest electric field intensity, as described before. If the word synchronization is established, the A channel equal to the stored P channel, instead of the best A channel, is used for connection with a base station. If the word synchronization is not established, the best A channel is compared with the P channel stored in the RAM 34. When there is coincidence between the best A channel and the stored P channel, the second best A channel is selected since it has already failed to establish the word synchronization on signals received over the A channel equal to the stored P channel. The word synchronization is attempted on signals received over the second best A channel.

Further, another embodiment of the access channel selecting operation corresponding to another embodiment of the paging channel selecting operation may be applicable to the present invention. Further, another embodiment is described as follows.

When the P channel is stored in the RAM 34, the control circuit 30 compares each of the A channels listed in the best list with the stored P channel. The control circuit 30 determines whether either of the A channels coincides with the P channel. If one of the A channels coincides with the P channel, the A channel is stored as the best channel to select even if the electric field intensity of signals received over the A channel is the second strongest. In particular, in the event that the channel coincident with the stored P channel is the channel with the second strongest electric field intensity, the A channel with the strongest electric field intensity is not defined as the best channel any more, but the second best. If neither of the A channels coincides with the P channel, the storing state of the RAM 34 is not changed (step 7a). Next, a word synchronization is performed on signals received through the best A channel (step 7b). If the word synchronization is performed within a predetermined period of time, the operation goes to a step 7d. If the word synchronization is not performed within a predetermined period of time, the second best A channel is used to repeat the above operation (step 7c). In this case, if the word synchronization is again not performed within a predetermined period of time, the initialization is resumed (step 2b).

Any one of the above described embodiments of the access channel selecting operation is applicable to the access channel selecting operation required responsive to a call origination which will be described later.

In any one of the above embodiments, after completing the word synchronization, a receive acknowledge signal is sent through the selected A channel to the base station (step 7d). Thereafter, a signal including information indicative of designated speech channels is received (step 7e). Thereafter, a shortened burst signal is sent to the base station and a time alignment is performed.

In this state, the designated speech channels which include a forward channel for transmitting audio signals to the base station and a backward channel for receiving audio signals from the base station are captured by controlling the frequency synthesizer 31 (step 7f). Thereby a communication link is established between the calling apparatus and the called apparatus.

The apparatus is set to be in a standby state for receiving a ringing signal from the base station (step 2f in FIG. 2). When a ringing signal is received, the apparatus generates a ringing tone. In this state, the apparatus is set to await the user's response (step 2g).

When the user responds to the ringing tone, that is, off-hooks, by taking the handset or depressing a "SEND" key on the console unit 35, the control circuit 30 performs a communication link with the calling apparatus through the base station (step 2h).

When the electric field intensity of the speech channels is less than a predetermined level for a predetermined time because of fading occurring in the step 2f or in the step 2g, the transmission is stopped (step 2i). In the state of awaiting the user's response or during communication, if the user puts the handset on-hook, the transmission is stopped (step 2i). After the transmission is stopped, the initialization is resumed (step 2b).

Figure 8:
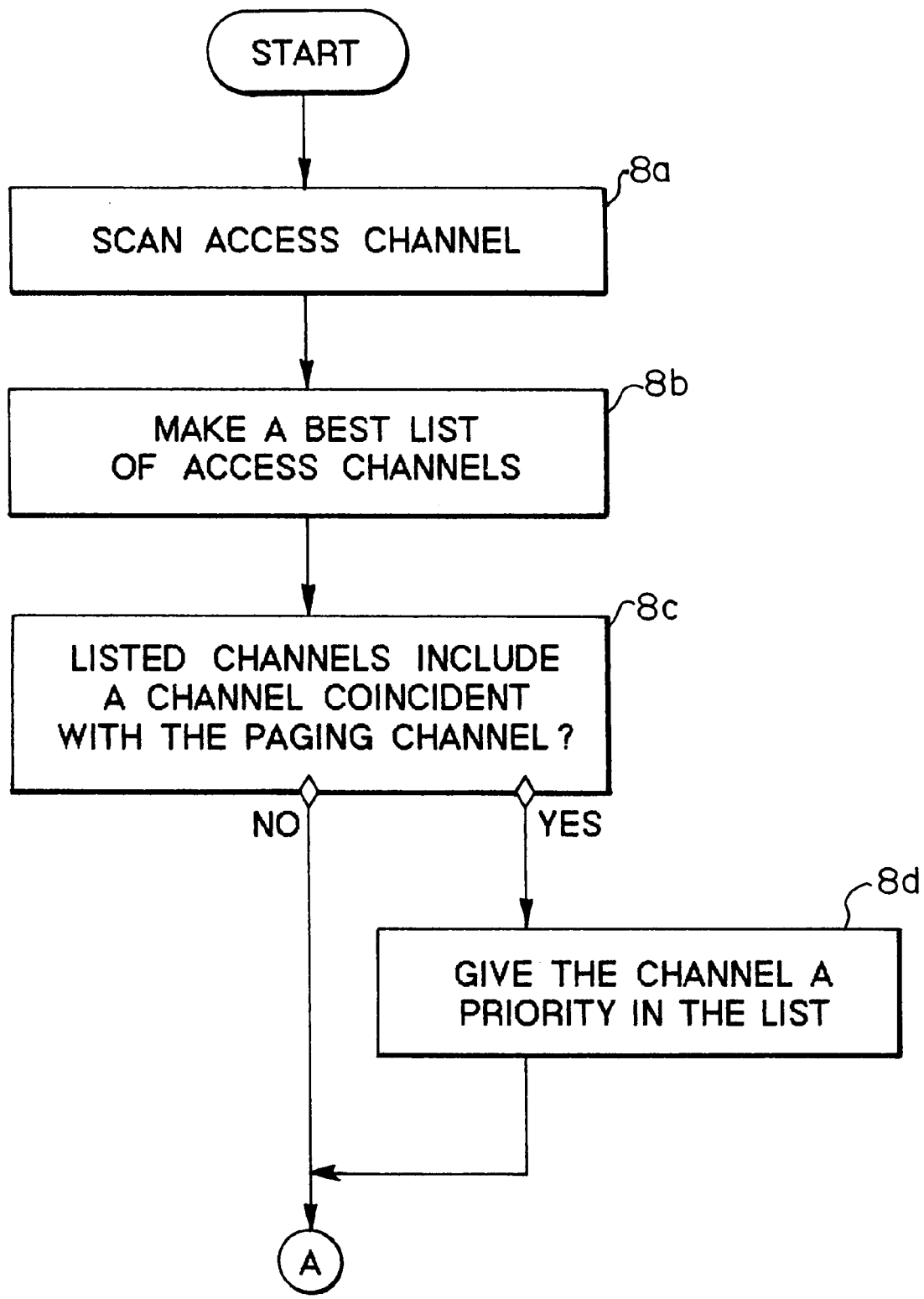
FIG. 8 is a flow chart illustrating a call origination operation sequence in the connection control operation.
Figure 9:
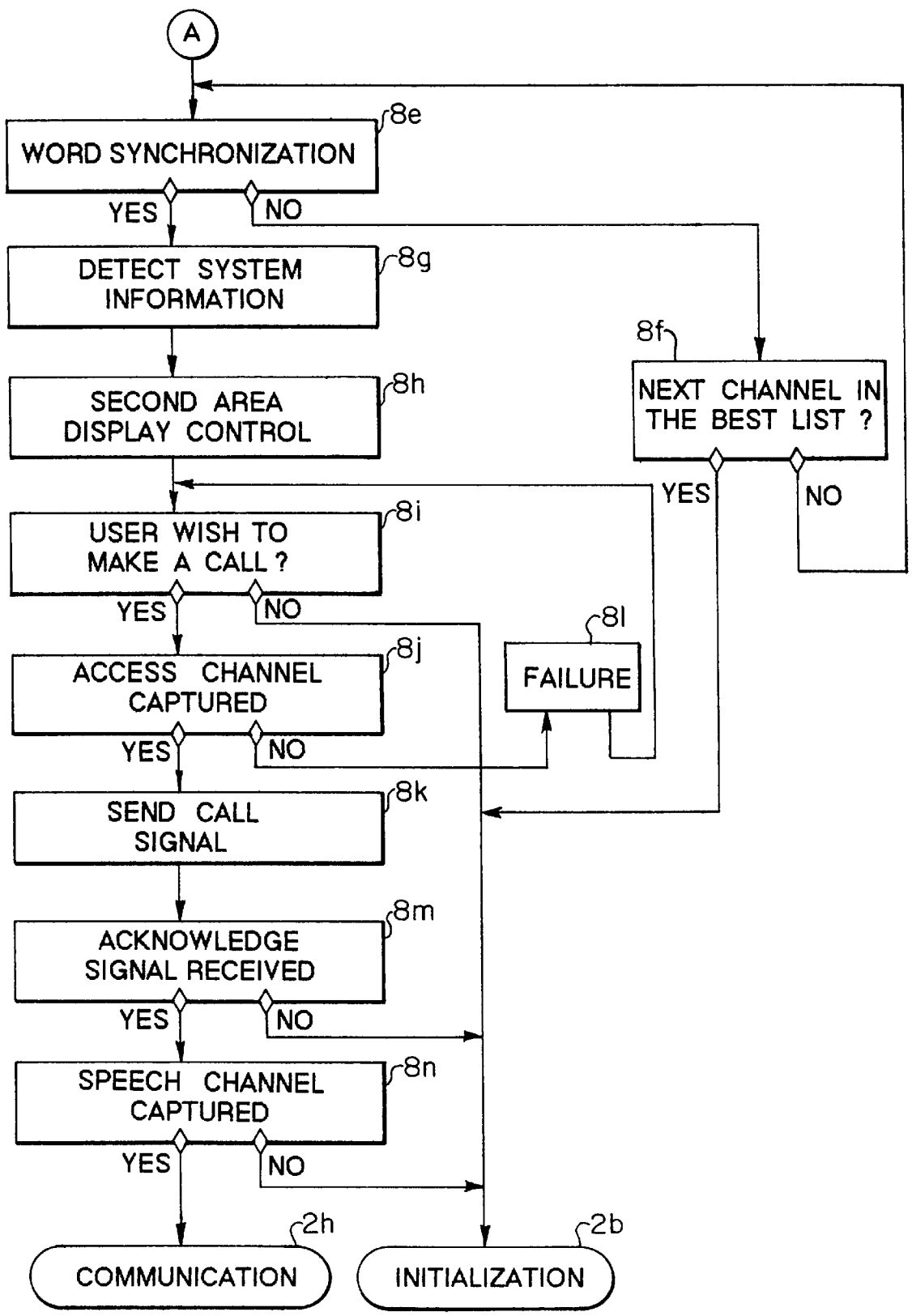
FIG. 9 is a flow chart illustrating a call origination operation sequence following the operation illustrated in the flow chart of FIG. 8.

In the standby state in the step 2d of FIG. 2, when a call request is detected by an input at the console unit 35 or a voice dialing, a call origination operation starts (step 2k). This operation is illustrated by FIGS. 8 and 9.

The control circuit 30 causes the receiver 21 to scan each predetermined A channel to obtain reception electric field intensity information. The reception electric field intensity information is supplied to the control circuit 30 from the receiver 21 (step 8a). An A channel having the strongest electric field intensity and an A channel having the second strongest electric field intensity are listed in a best list of A channels. In this case, the A channel having the strongest electric field intensity is given a priority (step 8b).

In the next step (step 8c), the control circuit 30 compares each of the A channels listed in the best list with the P channel stored in the RAM 34 in order to determine whether or not there is an A channel in the list which coincides with the stored P channel. The SIDp included in signals received over the stored P channel is coincident with the SIDH. If one of the listed A channels coincides with the stored P channel, the A channel is given a priority to select for the communication with a base station over a radio link. If the A channel coincident with the stored P channel is not one which has already been given a priority in the step 8b, the priority given to the other A channel in the step 8b is taken out (step 8d).

In the step 8c, if neither of the listed A channels coincides with the stored P channel, the A channel having the strongest electric field intensity keeps the priority given in the step 8b. As a result of the operations from the step 8a to the step 8d, the A channel given a priority is a favorite candidate to select for the communication with a base station over a radio link.

Next, the word synchronization operation is performed on signals received through the A channel given the priority (step 8e).

If the word synchronization cannot be established within a predetermined period of time, the control circuit 30 determines whether the A channel not given the priority in the best list exists without attempting to establish the word synchronization (step 8f). If the A channel exists, the word synchronization on signals over the A channel not given priority is performed. If the A channel not given priority does not exist, the initialization is resumed (step 2b).

If the word synchronization is established within the predetermined period of time in the step 8e, the control circuit 30 controls the frequency synthesizer 31 and the receiver 21 to prepare for receiving signals over the A channel. The system information included in the signal received over the A channel is supplied to the control circuit 30 through the receiver 21, the demodulator 22, and the error correction decoder 23. The control circuit 30 detects a SIDS indicated by the system information (step 8g).

As the next operation, the control circuit 30 performs the second area display control (step 8h).

Figure 10:
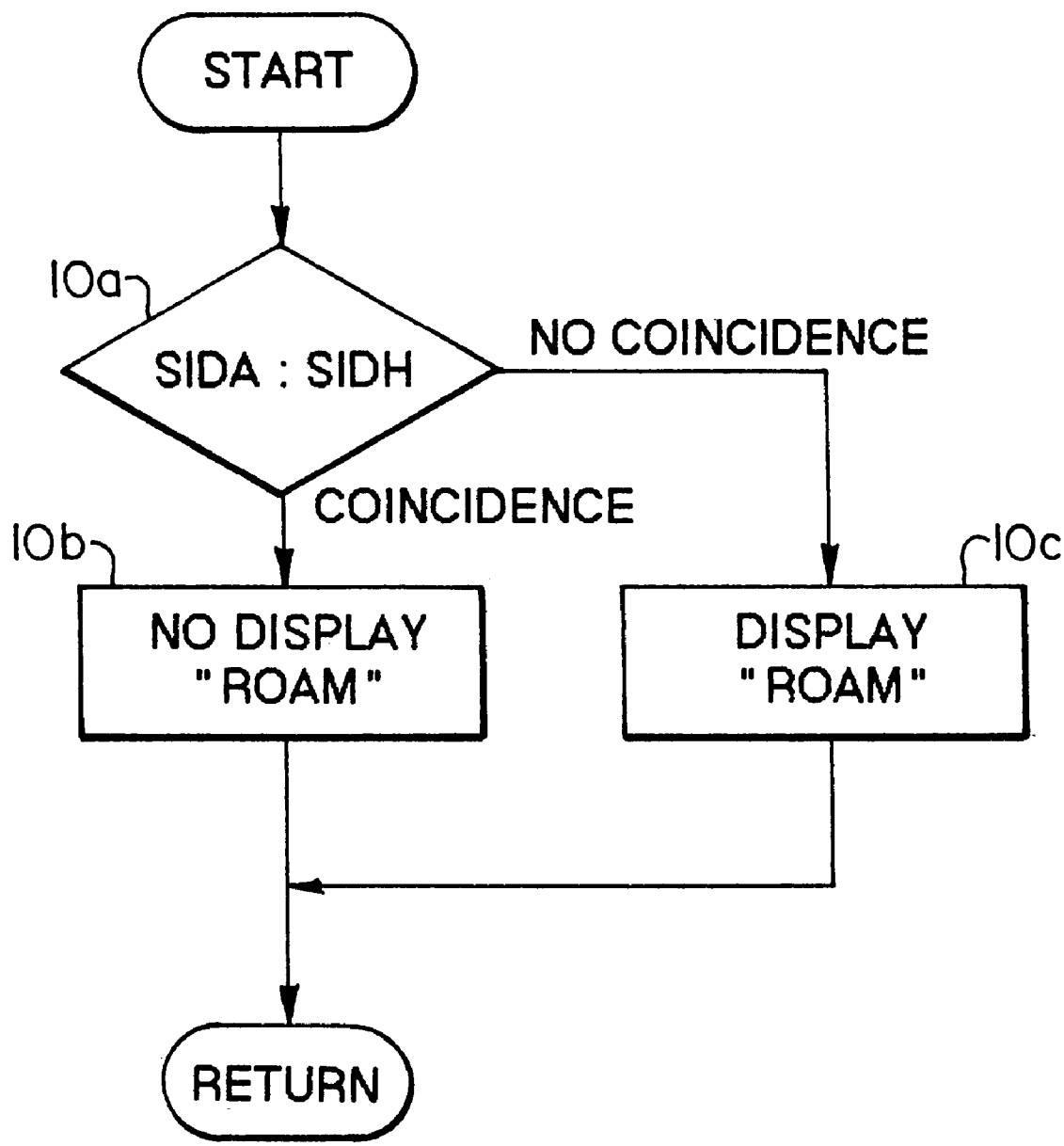
FIG. 10 is a flow chart illustrating a second display operation.

FIG. 10 is a detailed flow chart which illustrates the second area display control operation. The control circuit 30 compares the SIDA with the SIDH stored in the ID-ROM 33 (step 10a). Since the SIDH indicates the identification number of a service area in which the apparatus is registered, if the SIDA coincides with the SIDH, the control circuit 30 controls the driver 36 not to display "ROAM" on the LCD 37. This indicates that the apparatus is located in a home area (step 10b). On the other hand, if the SIDA does not coincide with the SIDH, the control circuit 30 controls the driver 36 to display "ROAM" on the LCD 37. This indicates that the apparatus is located in a home area (step 10c). Consequently, the user can recognize by the display whether the apparatus is about to be connected with a base station located in the home area or in the ROAM area.

In a step 8i, the control circuit 30 determines whether a key operation to terminate the call is made in response to the display on the LCD 37. If the user operates the key to terminate the call in response to the display such as "ROAM", the initialization is resumed (step 2b).

It is determined whether the A channel is captured (step 8j). If the A channel is not captured (step 8l), the system checks again whether the user wishes to make a call (step 8i).

If the A channel is captured in the step 8j, a call origination signal including the telephone number to be called, which is entered by the user, is transmitted over the A channel (step 8k).

Thereafter, the apparatus detects whether the acknowledge signal from the base station is received within a predetermined time (step 8m). When the acknowledge signal is received, a slot synchronization of a time slot assigned to the apparatus is established. A shortened burst signal is sent to the base station and a time alignment is performed.

The acknowledge signal includes information indicative of speech channels designated by the base station. The speech channels include a forward channel for transmitting audio signals to the base station and a backward channel for receiving audio signals from the base station. In the step 8n, the apparatus attempts to capture the speech channels by controlling the frequency synthesizer 31. If the apparatus succeeds to capture the speech channels, the base station calls the other apparatus to be called on the basis of the telephone number included in the call origination signal. A communication link over the designated speech channels may then be established between the apparatus and the called apparatus (step 2h).

If the acknowledge signal is not received within the predetermined time in the step 8m or if the apparatus fails to capture the speech channels in the step 8n, the initialization is resumed (step 2b).

According to the above embodiment, each best list for paging channels and access channels lists only two channels, respectively which have the strongest electric field intensity and the second strongest electric field intensity. Further, only two dedicated channels are obtained in the step 4a of FIG. 4. The operations of the present invention are, however, not limited to those described above. Three or more channels for each of dedicated channels, paging channels, and access channels may be listed in a best list of channels as candidates to be used for the connection with a base station according to its electric field intensity. In this case, the channels may be listed in the best list in a descending order. That is, the channel listed on the top of the best list has the strongest electric field intensity and accordingly is the favorite candidate to be used for the connection with the base station. The top listed channel is equivalent of the channel given a priority in the above embodiment.

When a plurality of access channels are listed in a descending order according to its electric field intensity, if the best list includes an access channel coincident with the paging channel which is used to connect with a base station, the access channel is given a priority so that the word synchronization is attempted to establish on from the access channel given the priority. The SIDp included in signals received over the paging channel which is used to connect with the base station is coincident with the SIDH. A secondly listed access channel is attempted next if the top listed channel is not one coincident with the paging channel. The attempt continues to the bottom listed access channel unless the word synchronization is established on the preceding access channels.

As another way of giving a priority to an access channel coincident with the paging channel which is used to connect with a base station, it may be possible to place the access channel on the top of the best list even if the access channel does not have the strongest electric field intensity and start to attempt to establish the word synchronization from the top listed access channel.

Figure 11:
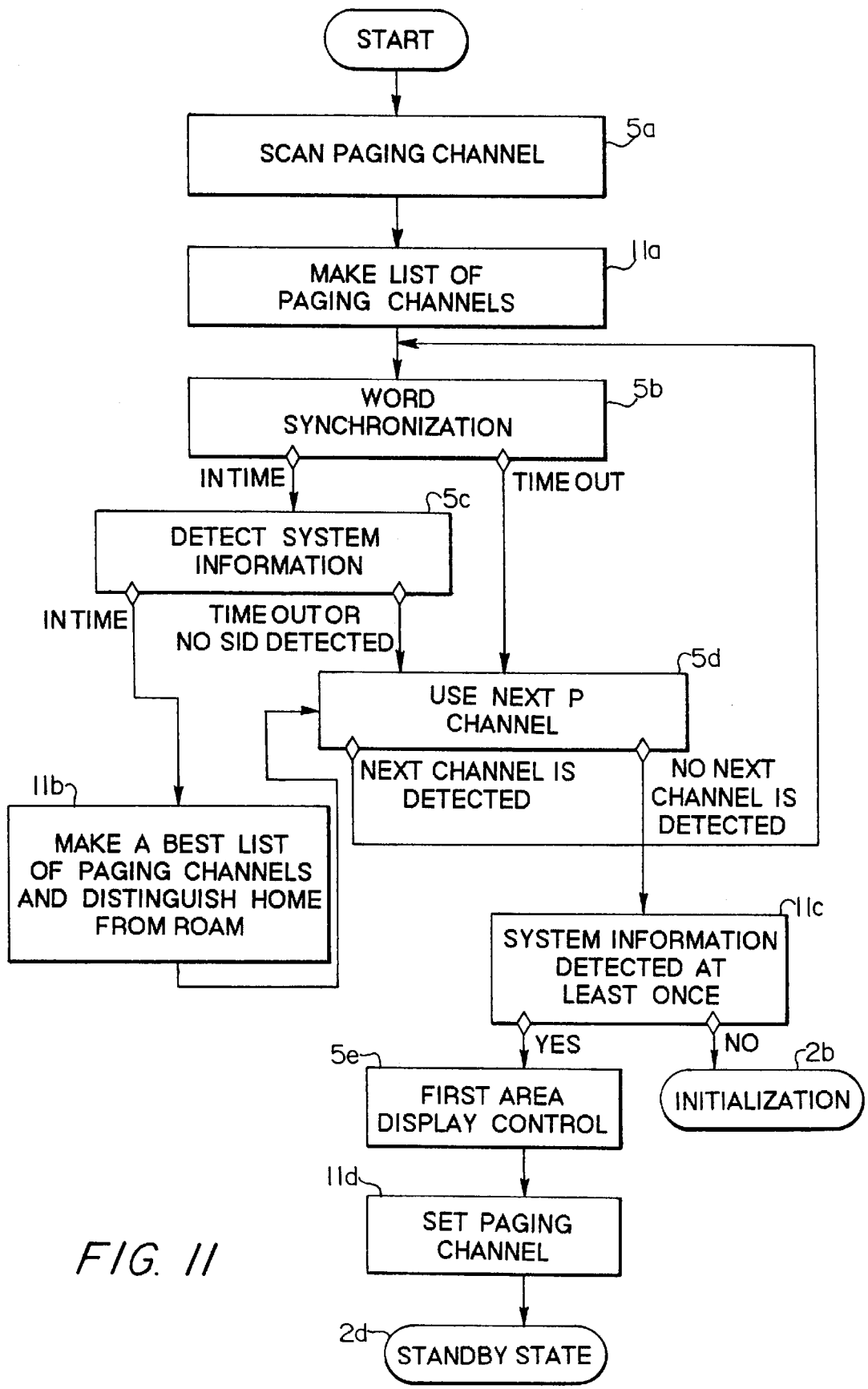
FIG. 11 is another flow chart illustrating an operation after initialization in the connection control operation.

FIG. 11 is a detailed flow chart which illustrates another way of the paging channel selection after initialization.

After scanning all paging channels in the step 5a, the control circuit 30 makes a list of paging channels having more than a predetermined electric field intensity. In the list, the channels are listed in a descending order according to its electric field intensity (step 11a).

In the step 5b, the apparatus attempts to establish the word synchronization on a paging channel listed on the top. If the word synchronization is established within a predetermined time, the apparatus detects SIDp included in system information from signals received over the paging channel (step 5c).

If the SIDp detection is succeeded within a predetermined time in the step 5c, the paging channel is listed in a best list with information of the SIDp (step 11b). The detected SIDp is compared with the SIDH stored in the ID-ROM 33 in the step 11b. According to the result of the comparison, the information of the SIDp is stored with the corresponding paging channel in the best list using a flag 1 indicating 'Home Area' or using a flag 0 indicating 'Roam Area'.

After the step 11b, a paging channel is changed to the next one listed in the step 11a (step 5d). Also, if the word synchronization is not established within the predetermined time in the step 5d or if the SIDp detection is failed in the step 5c, a paging channel is changed to the next one listed in the step 11a (step 5d). In the step 5d, if the next paging channel is detected, the operations of the steps 5b, 5c, and 11b are repeated.

By repeating the steps from 5b to 5d and 11b until the word synchronization is attempted on all paging channels listed in the step 11a, the best list is completed in the step 11b. The best list may be made for a home area and a roam area, respectively. Further, as an alternative, channels for a home area and channels for a roam area may be listed separately in the best list. Still further, as another alternative, whether for a home area or for a roam area, all channels are listed in a descending order according to its electric field intensity, with information such as flag 1 or flag 0. Any form of a best list is applicable to the present invention if paging channels for a home area is distinguished from paging channels for a roam area.

After the word synchronization is attempted on all paging channels listed in the step 11a, the control circuit 30 determines whether the best list is made in the step 11b, that is, system information is detected on at least one paging channel in the step 5c (step 11c). When no system information is detected, the initialization is resumed (step 2b).

If system information is detected on at least one paging channel, the first area display control is performed for the top listed paging channel for a home area in the best list, otherwise, the top listed paging channel for a roam area in the best list, in a manner already described with reference to FIG. 6 (step 5e). In a step 11d, the top listed paging channel for a home area, otherwise, the top listed paging channel for a roam area, is set for the communication with a base station during a standby state. The apparatus is on the standby state (step 2d).

Figure 12:
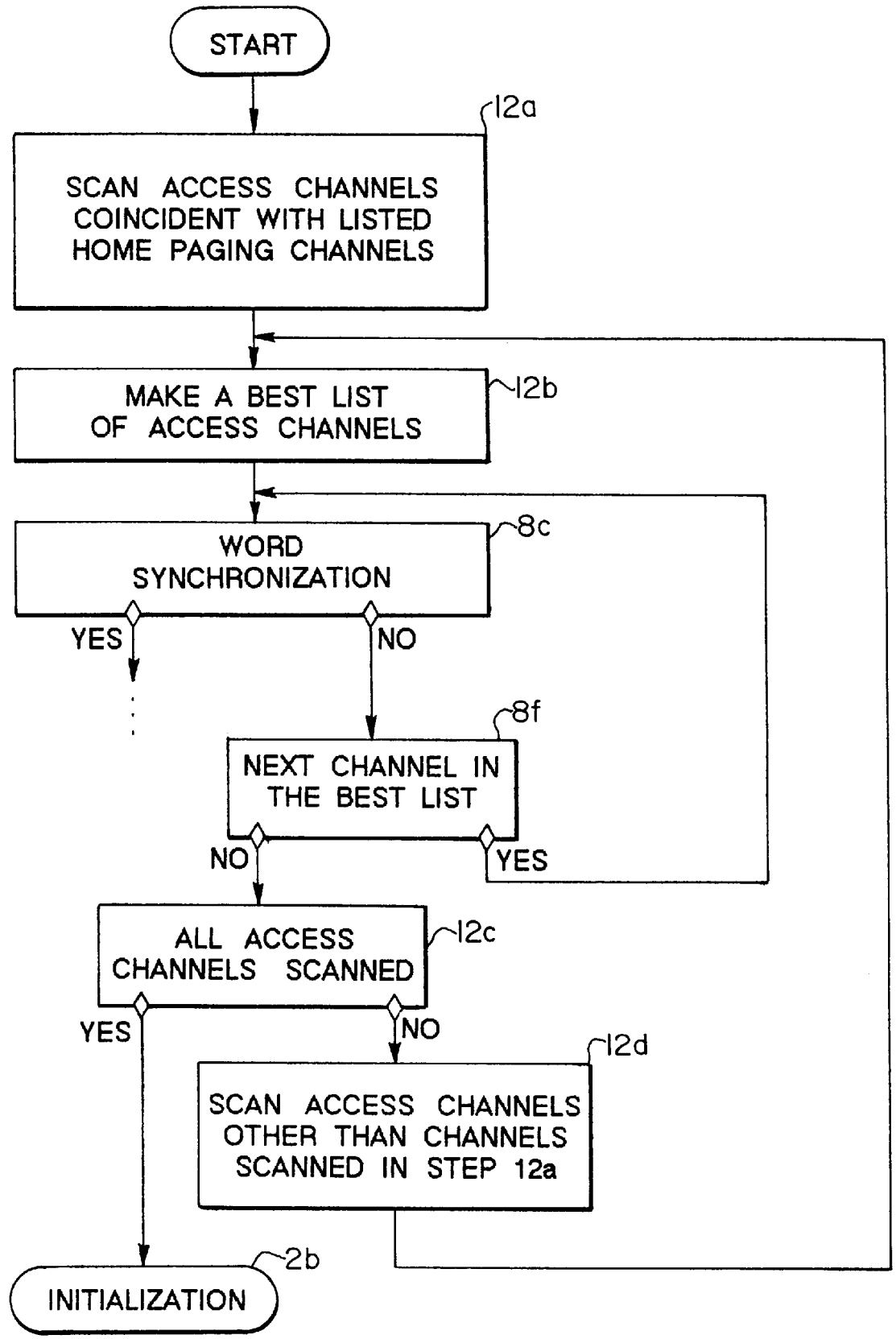
FIG. 12 is another flow chart illustrating a call origination operation sequence in the connection control operation.

FIG. 12 is a detailed flow chart which illustrates another way of access channel selection.

When the best list is made for the paging channels for a home area in a certain manner such as described in FIG. 11, the access channel selection shown in FIG. 12 is performed.

The control circuit 30 causes the receiver 21 to scan each of access channels coincident with the listed paging channels for a home area (step 12a).

After scanning those access channels, the control circuit 30 makes a best list of access channels having more than a predetermined electric field intensity. In the best list, the channels are listed in a descending order according to its electric field intensity (step 12b).

In the step 8e, the apparatus attempts to establish the word synchronization on an access channel listed on the top. If the word synchronization is established within a predetermined time, operations similar to the steps from 8g to 8n in FIG. 8 are performed.

If the word synchronization is not established in the step 8e, the control circuit 30 determines whether or not the access channels listed in the best list still exist without attempting to establish the word synchronization (step 8f). If at least one access channel exists, the word synchronization on signals received over the channel which may be the next channel in the best list is attempted in the step 8e.

On the other hand, if no next channel exists in the best list, the control circuit 30 determines whether or not all access channels including access channels for a roam area are scanned by the receiver 21 (step 12c).

If all access channels are not scanned, the control circuit 30 causes the receiver 21 to scan access channels other than the access channels scanned in the step 12a, such as access channels for a roam area (step 12d). The control circuit 30 makes a best list in the step 12b again. In the step 12c, when the control circuit 30 determines that all access channels are scanned, the initialization is resumed (step 2b).

According to the present invention, operations similar to those described with reference to FIG. 11 are applicable to operations of dedicated channel selection.

In the event the operations of dedicated channel selection are made in a similar manner to the operations described with reference to FIG. 11 and, in addition, the best list is made for the dedicated channels for a home area, the paging channel selection is described as follows.

Figure 13:
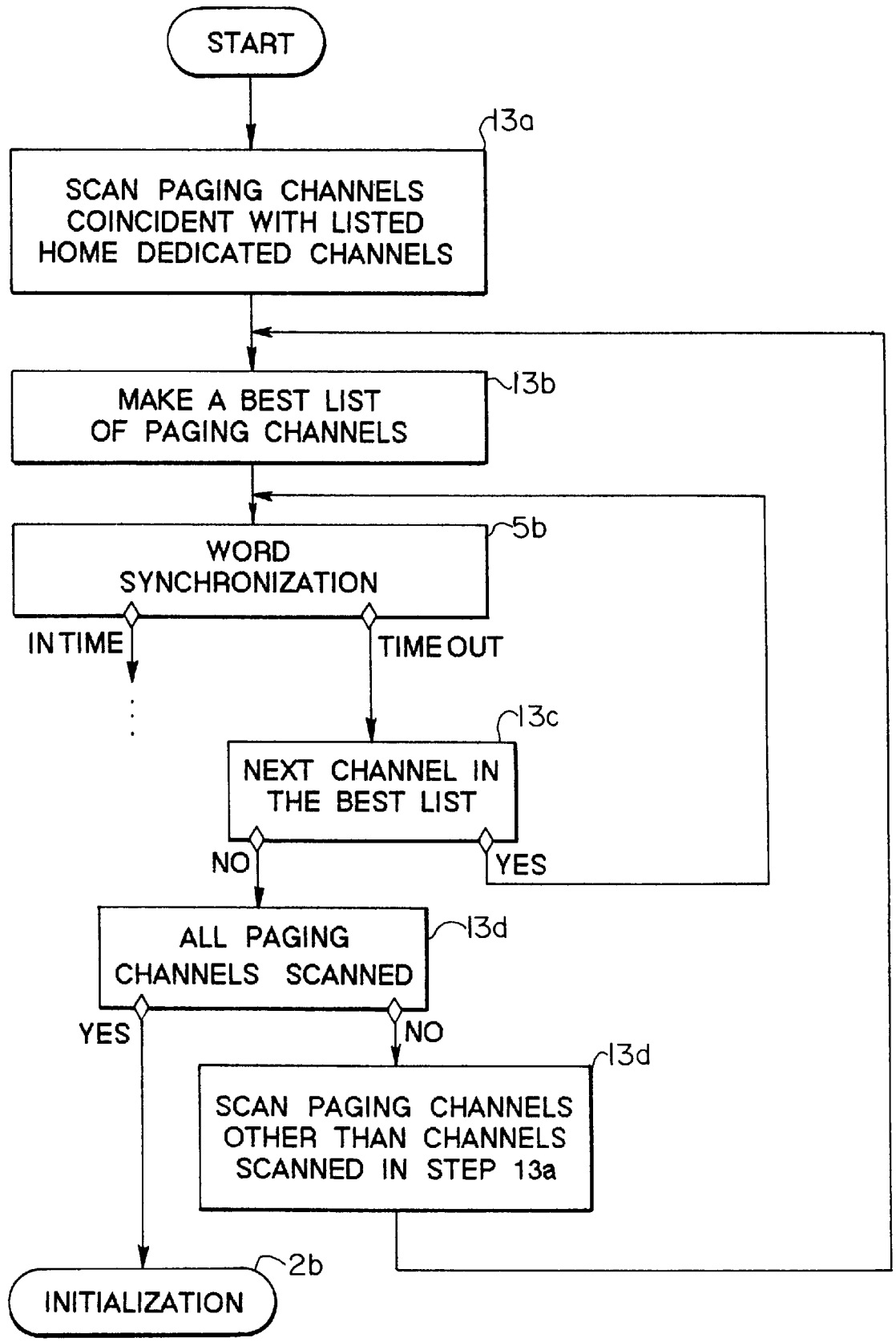
FIG. 13 is further another flow chart illustrating an operation after initialization in the connection control operation.

FIG. 13 is a detailed flow chart which illustrate further another way of the paging channel selection after initialization.

The control circuit 30 causes the receiver 21 to scan each of paging channels coincident with the listed dedicated channels for a home area (step 13a).

After scanning those paging channels, the control circuit 30 makes a best list of paging channels having more than a predetermined electric field intensity. In the best list, the channels are listed in a descending order according to its electric field intensity (step 13b).

In the step 5b, the apparatus attempts to establish the word synchronization on a paging channel listed on the top. If the word synchronization is established within a predetermined time, operations similar to the steps from 5e and 5f in FIG. 5 are performed.

If the word synchronization is not established in the step 5b, the control circuit 30 determines whether or not the paging channels listed in the best list still exist without attempting to establish the word synchronization (step 13c). If at least one paging channel exists, the word synchronization on signals received over the channel which may be the next channel in the best list is attempted in the step 5b.

On the other hand, if no next channel exists in the best list, the control circuit 30 determines whether or not all paging channels including paging channels for a roam area are scanned by the receiver 21 (step 13d).

If all paging channels are not scanned, the control circuit 30 causes the receiver 21 to scan paging channels other than the paging channels scanned in the step 13a, such as paging channels for a roam area (step 13e). The control circuit 30 makes a best list in the step 13b again. In the step 13d, when the control circuit 30 determines that all paging channels are scanned, the initialization is resumed (step 2b).

As described above, according to the radio communication apparatus of the present invention, in selecting an access channel, if scanned access channels includes the paging channel which is used for the communication with a base station located in a home service area during a standby-state, an access channel coincident with the paging channel is given a priority in the best list of access channels and may be selected and used for a call organization and a call reception communication with the base station.

Figure 14:
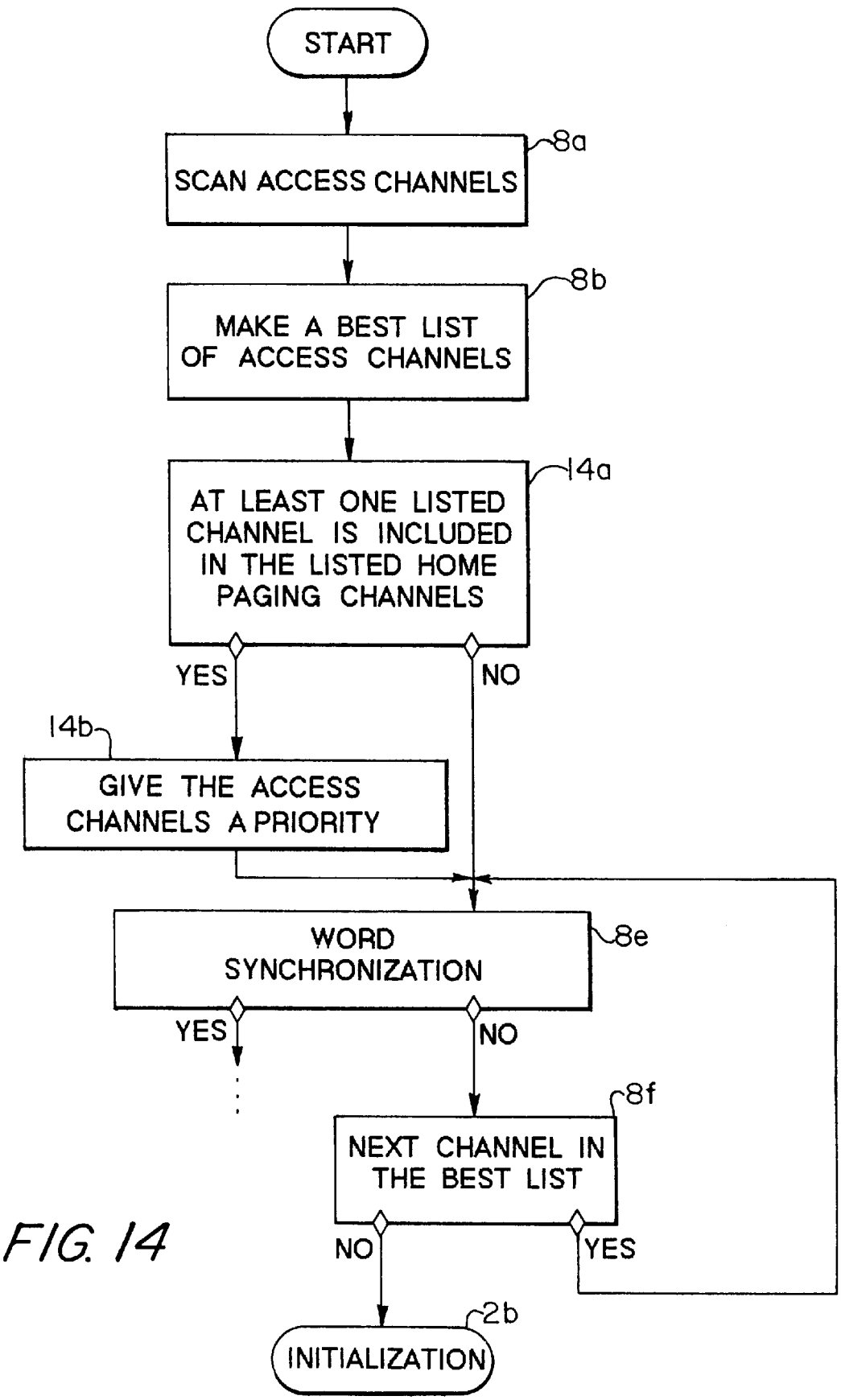
FIG. 14 is further another flow chart illustrating a call origination operation sequence in the connection control operation.
Figure 15:
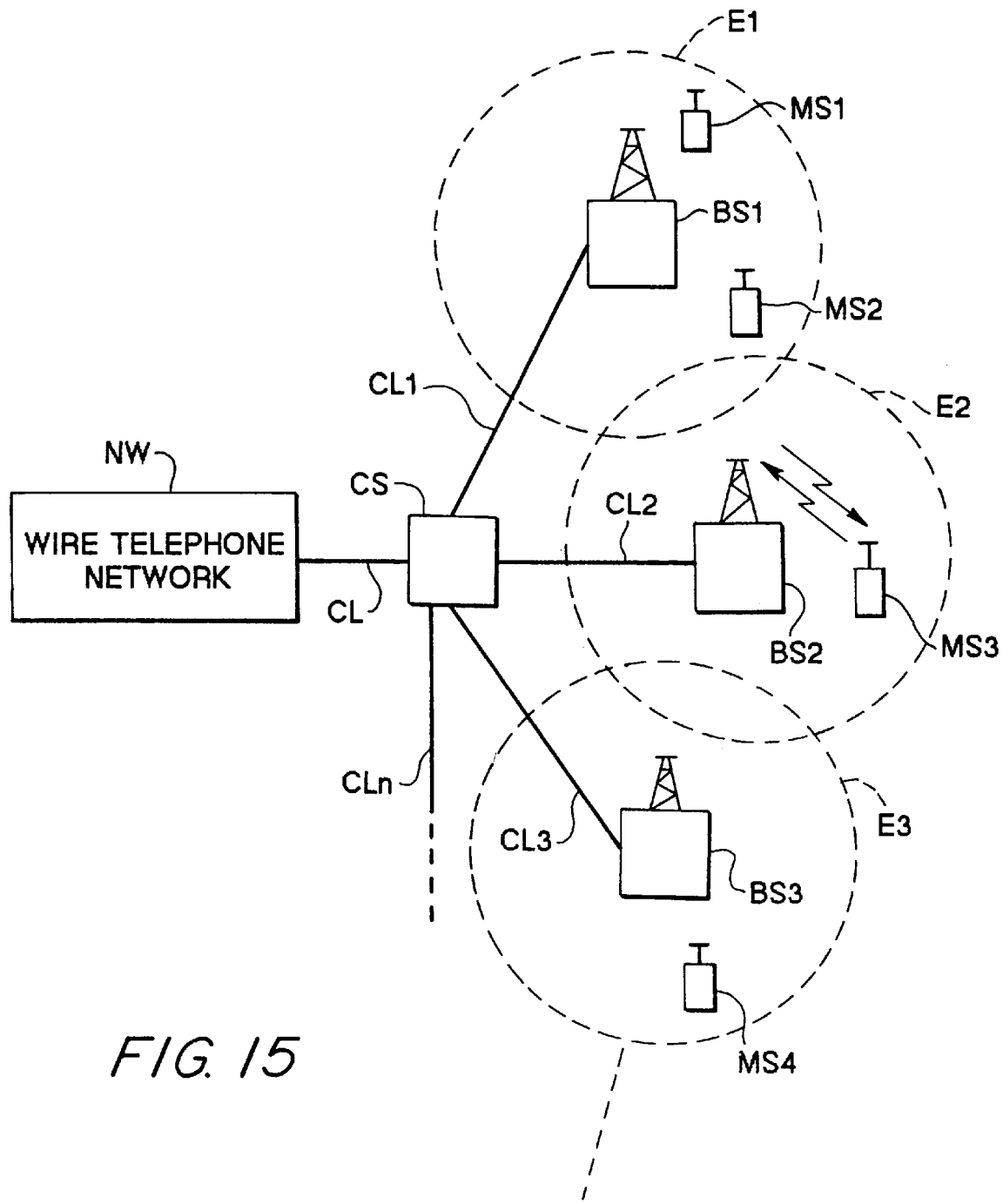
FIG. 15 is a block diagram illustrating a plurality of zones covered by base stations in a conventional radio telephone system.

FIG. 14 is a detailed flow chart which illustrates further another way of access channel selection in the call origination operations.

When the best list is made for the paging channels for a home area in a certain manner such as described in FIG. 11, the access channel selection shown in FIG. 14 may be performed.

The control circuit 30 causes the receiver 21 to scan each of access channels (step 8a).

After scanning those access channels, the control circuit 30 makes a best list for access channels having more than a predetermined electric field intensity. In the best list, for example, two access channels are listed in a descending order according to its electric field intensity (step 8b).

The control circuit 30 compares each of the A channels listed in the best list for access channels with each of the P channels listed in the best list for home paging channels (step 14a). If one or more A channels listed in the best list for access channels coincide with one or more P channels listed in the best list for home paging channels, in other words, if the best list for home paging channels includes channels coincident with the A channels listed in the best list for access channels, the one or more A channels are given a priority (step 14b).

In a step 8e, the apparatus attempts to establish the word synchronization on signals received over A channels listed in the best list. When there is an A channel given the priority in the best list, the word synchronization is attempted on signals received over the access channel given the priority, prior to the other channel. On the other hand, when there is not an A channel given the priority in the best list, the word synchronization is attempted on signals received over the access channel with the strongest electric field intensity, prior to the other channel.

If the word synchronization is established within a predetermined time, operations similar to the steps from 8g to 8n in FIG. 8 are performed.

If the word synchronization is not established in the step 8e, the control circuit 30 determines whether or not the access channels listed in the best list still exist without attempting to establish the word synchronization (step 8f). If at least one access channel exists, the word synchronization on signals received over the channel which may be the next channel in the best list is attempted in the step 8e. In the step 8f, if no next channel exists in the best list, the initialization is resumed (step 2b).

According to the present invention, when the apparatus is connected with a base station in a home area without the display 'ROAM', even if the apparatus is located in a border area between the home area and a roam area, the apparatus has a high possibility of connecting with the base station in the home area. The base station may be one with which the apparatus is connected during the standby state. This avoids charging unwilling high fees to the user, since the speech communication is made through the same base station as one with which the apparatus has been connected over the access channel. In particular, this is important when there is no display on the connected base station.

In addition, by means of displaying 'ROAM', the radio telephone apparatus of the present invention gives the user an opportunity for stopping entering into the speech communication which charged a high user fee.

Further, according to the present invention, whether the apparatus is connected, over a paging channel, with a base station in a home area or in a roam area, the apparatus attempts to be connected, over an access channel, with a base station in a home area prior to base stations in roam areas. It is useful to reduce user fees for calls as much as possible.

According to the embodiment described above, the display displays 'ROAM' when the apparatus is connected with a base station in a roam area over a paging channel or an access channel. As informing means, however, instead of the LCD display, an LED, beep sound, melody, speech message by a voice recording or speech synthesis technique, or the like may be utilized. In addition, informing means may inform a user of that the apparatus is located in a home area, for example, by displaying 'HOME' on a display.

Further, the number of system identification numbers for home areas are not limited to only one but any numbers corresponding to the number of service areas in which the apparatus is registered as home service areas.

Furthermore, the access channel selecting technique described for the call origination operation is applicable for the call reception operation, and vice versa.

Still further, although the embodiments of the present invention applied to a radio telephone apparatus have been described above, the present invention may be applied to any other kind of radio communication apparatus used in a radio communication apparatus in which radio channels used during a standby state for awaiting a call origination or a call reception are also utilized as radio channels for the call origination or the call reception between the apparatus and a base station, including but not limited to an automobile telephone, a portable telephone, a cordless telephone, a dual or multiple mode radio telephone, and a personal communication terminal.

Other variations such as best list making may be made within the scope of the present invention.

What is claimed is:

1. A radio communication apparatus for use in a radio communication system, wherein a plurality of radio channels in a predetermined band of frequencies include a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, the radio communication apparatus comprising:

storing means for storing at least one stored system identification number corresponding to at least one of the service areas;

listing means for listing channels of the first group, wherein the system identification number included in the signals transmitted over each channel listed by the listing means coincides with the stored system identification number; and selecting means for selecting a channel of the second group either from channels listed by the listing means or from channels of the second group that are not listed by the listing means, the selecting means giving preference to the channels listed by the listing means over channels of the second group that are not listed by the listing means, and wherein the channel selected by the selecting means is used for the call origination or the call reception.

2. The radio communication apparatus according to claim 1, wherein the signals received over each channel listed by the listing means have an electric field intensity greater than a predetermined electric field intensity.

3. A radio communication apparatus for use in a radio communication system, wherein a plurality of radio channels in a predetermined band of frequencies include a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, the radio communication apparatus comprising:

storing means for storing at least one stored system identification number corresponding to at least one of the service areas;

listing means for listing at least two of the channels of the first group, wherein the system identification number included in the signals transmitted over each channel listed by the listing means coincides with the stored system identification number;

first selecting means for selecting one of the channels of the first group, the channel selected by the first selecting means being used while awaiting the call origination or the call reception; and second selecting means for selecting one of the channels of the second group either from the channels listed by the listing means or from channels of the second group that are not listed by the listing means, the second selecting means giving preference to the channels listed by the listing means over the channels of the second group that are not listed by the listing means, and wherein the channel selected by the second selecting means is used for the call origination or the call reception.

4. The radio communication apparatus according to claim 3, wherein the signals received over each channel listed by the listing means have an electric field intensity greater than a predetermined electric field intensity.

5. A radio communication apparatus for use in a radio communication system, wherein a plurality of radio channels in a predetermined band of frequencies include a first group of channels used while awaiting a call origination or a call reception and a second group of channels used in response to the call origination or the call reception, the system including a plurality of service areas, each of the service areas being assigned a system identification number which is broadcast by one or more base stations over at least one of the radio channels, the radio communication apparatus comprising:

storing means for storing at least one stored system identification number corresponding to at least one of the service areas;

receiving means for receiving a plurality of signals, each of the signals being transmitted over at least one of the radio channels, each of the signals including a system identification number;

first listing means for listing at least two of the channels of the first group, wherein the system identification number included in the signals transmitted over each channel listed by the first listing means coincides with the stored system identification number;

first selecting means for selecting one of the channels of the first group, the channel selected by the selecting means being used while awaiting the call origination or the call reception;

second listing means for listing at least two of the channels of the second group, the channels listed by the second listing means being coincident with the channels listed by the first listing means;

comparing means for comparing the channel selected by the first selecting means with the channels listed by the second listing means;

second selecting means for selecting one of the channels listed by the second listing means when the comparing means determines a coincidence between the channel selected by the first selecting means and one of the channels listed by the second listing means; and synchronizing means for establishing word synchronization on the signals received over at least one of the channels listed by the second listing means, and wherein the channels over which the signals are synchronized are used for the call origination or the call reception.

6. The radio communication apparatus according to claim 5, wherein the signals received over the channels listed by the first listing means have an electric field intensity greater than a first predetermined electric field intensity.

7. The radio communication apparatus according to claim 6, wherein the first listing means lists the channels listed by the first listing means in descending order according to electric field intensity of the signals received over the channels listed by the first listing means.

8. The radio communication apparatus according to claim 5, wherein the signals received over each channel listed by the second listing means have an electric field intensity greater than a second predetermined electric field intensity.

9. The radio communication apparatus according to claim 8, wherein the second listing means lists the channels listed by the second listing means in descending order according to electric field intensity of the signals received over the channels listed by the second listing means.

10. The radio communication apparatus according to claim 5, further comprising informing means for informing a user of at least one of the service areas having the system identification number which coincides with the system identification number included in the signals transmitted over the channel selected by the selecting means.

11. The radio communication apparatus according to claim 5, further comprising informing means for informing a user of at least one of the service areas having the system identification number which coincides with the system identification number included in the signals synchronized by the synchronizing means.

12. A radio communication apparatus for use in a radio communication system, wherein a plurality of radio channels in a predetermined band of frequencies includes a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, the radio communication apparatus comprising:

a storing device for storing at least one stored system identification number corresponding to a service area;

a listing device for listing at least two of the channels of the first group, wherein the system identification number included in each signal transmitted over each channel listed by the listing device coincides with the stored system identification number;

a first selecting circuit for selecting one of the channels of the first group, the channel selected by the first selecting device being used while awaiting the call origination or the call reception; and a second selecting circuit for selecting one of the channels of the second group either from the channels listed by the listing device or from channels of the second group that are not listed by the listing device, the second selecting circuit preferring the channels listed by the listing device over the channels of the second group that are not listed by the listing device, and wherein the channel selected by the second selecting circuit is used for the call origination or the call reception.

13. A radio communication apparatus for use in a radio communication system, wherein a plurality of radio channels in a predetermined band of frequencies include a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, the radio communication apparatus comprising:

a storage device for storing at least one stored system identification number corresponding to at least one of the service areas;

a processor connected to the storage device and configured to:

list channels of the first group, wherein the system identification number included in the signals transmitted over each channel of the first group that is listed coincides with the stored system identification number, and select a channel of the second group either from channels of the first group that are listed or from channels of the second group that are not listed, the processor selecting the channel of the second group based on a preference of the channels listed over the channels of the second group that are not listed, and wherein the channel selected is used for the call origination or the call reception.

14. The radio communication apparatus according to claim 13, wherein the processor is further configured to list channels of the first group based on whether the signals received over the channels of the first group have an electric field intensity greater than a predetermined electric field intensity.

15. A radio communication apparatus for use in a radio communication system, wherein a plurality of radio channels in a predetermined band of frequencies include a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, the radio communication apparatus comprising:

a storage device for storing at least one stored system identification number corresponding to at least one of the service areas; and a processor connected to the storage device and the receiver and configured to:

list at least two of the channels of the first group, wherein the system identification number included in the signals transmitted over each channel of the first group that is listed coincides with the stored system identification number, select one of the channels of the first group over which the signals are received by the receiver, the channel of the first group that is selected being used while awaiting the call origination or the call reception, and select one of the channels of the second group either from the channels of the first group that are listed or from the channels of the second group that are not listed, the processor selecting the one of the channels of the second group based on a preference of the channels listed over the channels of the second group that are not listed, and wherein the channel of the second group that is selected is used for the call origination or the call reception.

16. The radio communication apparatus according to claim 15, wherein the processor is further configured to list channels of the first group based on whether the signals received over the channels of the first group have an electric field intensity greater than a predetermined electric field intensity.

17. A radio communication apparatus for use in a radio communication system, wherein a plurality of radio channels in a predetermined band of frequencies include a first group of channels used while awaiting a call origination or a call reception and a second group of channels used in response to the call origination or the call reception, the system including a plurality of service areas, each of the service areas being assigned a system identification number which is broadcast by one or more base stations over at least one of the radio channels, the radio communication apparatus comprising:

a storage device for storing at least one stored system identification number corresponding to at least one of the service areas;

a receiver for receiving a plurality of signals, each of the signals being transmitted over at least one of the radio channels, each of the signals including a system identification number;

a processor connected to the storage device and the receiver configured to:

list at least two of the channels of the first group, wherein the system identification number included in the signals transmitted over each channel of the first group that is listed coincides with the stored system identification number, select one of the channels of the first group over which the signals are received by the receiver, the channel of the first group that is selected being used while awaiting the call origination or the call reception, list at least two of the channels of the second group, the channels of the second group that are listed being coincident with the channels of the first group that are listed, compare the channel of the first group selected with the at least two channels of the second group listed, and select one of the channels of the second group listed responsive to a coincidence between the channel of the first group selected and one of the channels of the second group listed; and a synchronizing circuit connected to the processor for establishing word synchronization on the signals received over at least one of the channels of the second group that are listed, and wherein the channels over which the signals are synchronized are used for the call origination or the call reception.

18. The radio communication apparatus according to claim 17, wherein the processor is further configured to list channels of the first group based on whether the signals received over the channels of the first group have an electric field intensity greater than a predetermined electric field intensity.

19. The radio communication apparatus according to claim 18, wherein the processor is further configured to list the channels of the first group that are listed in descending order according to electric field intensity of the signals received over the channels of the first group that are listed.

20. The radio communication apparatus according to claim 18, wherein the processor is further configured to list the channels of the second group that are listed in descending order according to electric field intensity of the signals received over the channels of the second group that are listed.

21. The radio communication apparatus according to claim 17, wherein the processor is further configured to list channels of the second group based on whether the signals received over the channels of the second group have an electric field intensity greater than a predetermined electric field intensity.

22. In a radio communication apparatus for use in a radio communication system, wherein a plurality of radio channels in a predetermined band of frequencies include a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, a method comprising the steps of:

storing at least one stored system identification number corresponding to at least one of the service areas;

listing channels of the first group, wherein the system identification number included in the signals transmitted over each channel of the first group that is listed coincides with the stored system identification number; and selecting a channel of the second group either from channels of the first group that are listed or from channels of the second group that are not listed, the step of selecting including selecting the channel of the second group based on a preference for the channels that are listed over the channels of the second group that are not listed, and wherein the channel selected is used for the call origination or the call reception.

23. The method according to claim 22, wherein the step of listing includes listing channels of the first group based on whether the signals received over the channels of the first group have an electric field intensity greater than a predetermined electric field intensity.

24. In a radio communication apparatus for use in a radio communication system, wherein a plurality of radio channels in a predetermined band of frequencies include a first group of channels used while awaiting a call origination or a call reception and a second group of channels used in response to the call origination or the call reception, a plurality of signals each being transmitted over at least one of the radio channels, each of the signals including a system identification number, the system including a plurality of service areas, each of the service areas being assigned a system identification number which is broadcast by one or more base stations over at least one of the radio channels, a method comprising the steps of:

storing at least one stored system identification number corresponding to at least one of the service areas;

listing at least two of the channels of the first group, wherein the system identification number included in the signals transmitted over each channel of the first group that is listed coincides with the stored system identification number;

first selecting one of the channels of the first group, the channel of the first group that is selected being used while awaiting the call origination or the call reception; and second selecting one of the channels of the second group from either the channels of the first group that are listed or the channels of the second group that are not listed, the step of second selecting including selecting one of the channels of the second group based on a preference of the channels that are listed over the channels of the second group that are not listed, and wherein the channel of the second group that is selected is used for the call origination or the call reception.

25. The method according to claim 24, wherein the step of listing includes listing channels of the first group based on whether the signals received over the channels of the first group have an electric field intensity greater than a predetermined electric field intensity.

26. In a radio communication apparatus for use in a radio communication system, wherein a plurality of radio channels in a predetermined band of frequencies include a first group of channels used while awaiting a call origination or a call reception and a second group of channels used in response to the call origination or the call reception, the system including a plurality of service areas, each of the service areas being assigned a system identification number which is broadcast by one or more base stations over at least one of the radio channels, a method comprising the steps of:

- storing at least one stored system identification number corresponding to at least one of the service areas;
- receiving a plurality of signals, each of the signals being transmitted over at least one of the radio channels, each of the signals including a system identification number;
- first listing at least two of the channels of the first group, wherein the system identification number included in the signals transmitted over each channel of the first group that is listed coincides with the stored system identification number;
- first selecting one of the channels of the first group over which the signals are received by the receiver, the channel of the first group that is selected being used while awaiting the call origination or the call reception;
- second listing at least two of the channels of the second group, the channels of the second group that are listed being coincident with the channels of the first group that are listed;
- comparing the channel selected in the step of first selecting with the channels listed in the step of second listing;
- second selecting one of the channels listed in the step of the second listing responsive to a determination of a coincidence in the step of comparing between the channel selected in the step of first selecting and one of the channels listed in the step of second listing; and
- establishing word synchronization on the signals received over at least one of the channels of the second group that are listed, and wherein the channels over which the signals are synchronized are used for the call origination or the call reception.

27. The method according to claim 26, wherein the step of first listing includes listing channels of the first group based on whether the signals received over the channels of the first group have an electric field intensity greater than a predetermined electric field intensity.

28. The method according to claim 27, wherein the step of first listing further includes listing the channels of the first group that are listed in descending order according to electric field intensity of the signals received over the channels of the first group that are listed.

29. The method according to claim 27, wherein the step of second listing further includes listing the channels of the second group that are listed in descending order according to electric field intensity of the signals received over the channels of the second group that are listed.

30. The method according to claim 26, wherein the step of second listing includes listing channels of the second group based on whether the signals received over the channels of the second group have an electric field intensity greater than a predetermined electric field intensity.

* * * * *